United States Patent Office 3,763,249
Patented Oct. 2, 1973

3,763,249
DIHALOGENATION OF 1,4-SUBSTITUTED
ALKYLCYCLO-HEXANES
Abraham Schneider, Overbrook Hills, Pa., assignor to
Sun Research and Development Co., Philadelphia, Pa.
No Drawing. Filed Mar. 31, 1971, Ser. No. 129,953
Int. Cl. C07c 17/00
U.S. Cl. 260—648 A                     13 Claims

ABSTRACT OF THE DISCLOSURE

Alkylcyclohexanes having 2–6 unbranched alkyl substituents including a single substituent at each of the 1- and 4-positions are dichlorinated, dibrominated or difluorinated at the 1,4-positions by reaction with a $C_4$–$C_5$ tertiary alkyl chloride, bromide or fluoride. The reaction is effected by contacting a mixture of the reactants, containing a large molar excess (>2:1) of the tertiary alkyl halide, with 90–100% sulfuric acid or 90–100% hydrofluoric acid at a temperature below 50° C., preferably 0–30° C. The recovered 1,4 - dihaloalkylcyclohexanes have utility as intermediates for preparing difunctional derivatives, e.g. diacids, dialcohols or diamides, which are useful as monomers in polymer manufacture.

CROSS REFERENCES TO RELATED APPLICATIONS

My copending application Ser. No. 715,958, filed Mar. 26, 1968, now Pat. 3,577,468, issued May 4, 1971, discloses the reaction of alkyladamantanes at −30° C. to 10° C. with $C_4$–$C_5$ tertiary alkyl chlorides, bromides or fluorides, using as catalyst sulfuric acid or hydrofluoric acid of 90–100% strength. The products are essentially monohalo derivatives, although small amounts of dihaloalkyladamantanes may be formed in this reaction.

My copending application Ser. No. 726,132, filed May 2, 1968, now Pat. 3,577,469, issued May 4, 1971, describes the reaction of cis-decahydronaphthalene at −20° C. to 25° C. with $C_4$–$C_5$ tertiary alkyl halides in the presence of sulfuric acid of 90–100% $H_2SO_4$ to yield mainly trans-9-halodecahydronaphthalene. In this reaction the formation of dihalo derivatives is practically negligible.

My copending application Ser. No. 883,579, filed Dec. 9, 1969, discloses the preparation of dihalo derivatives of alkylcyclohexanes having 1–6 unbranched alkyl substituents on the ring. The procedure involves the use of a $C_4$–$C_5$ tertiary alkyl halide with $AlCl_3$ or $AlBr_3$ as catalyst. This type of catalyst can cause isomerization of alkyl groups on the ring.

My copending application Ser. No. 129,933, filed of even date herewith, relates to the dihalogenation of certain doubly branched $C_8$ or higher isoparaffins employing the same catalysts (i.e. $H_2SO_4$ or HF) and same reaction conditions as used in the present invention.

My copending application Ser. No. 715,958, filed Mar. 26, 1968, now Pat. 3,577,468, issued May 4, 1971, discloses the monohalogenation of alkyladamantane hydrocarbons by reaction with a $C_4$–$C_5$ tertiary alkyl halide in the presence of sulfuric acid as catalyst and shows that in this reaction a small amount of dihalogenated alkyladamantane is produced.

BACKGROUND OF THE INVENTION

This invention relates to the conversion of certain alkylcyclohexanes containing 2–6 unbranched alkyl groups of the $C_1$–$C_3$ range into dihalogenated derivatives in which the halogen is chlorine, bromine or fluorine. The halogenating agent is a $C_4$–$C_5$ tertiary alkyl chloride, bromide or fluoride. The products are 1,4-dihaloalkylcycloalkanes also having alkyl substituents at the 1,4-positions, for example, 1,4-dichloro-1,4-dimethylcyclohexane. These products have utility as intermediates for preparing difunctional derivatives, e.g., diacids, dialcohols or diamides, which are useful as monomers in polymer manufacture.

Hydrogen-halogen exchange reactions between a tertiary alkyl halide, such as t-butyl chloride, and various hydrocarbons containing one or more tertiary hydrogen atoms, wherein an aluminum chloride catalyst has been used, have been described in the prior art for effecting monohalogenation. Such procedure has been shown, for example, by C. W. Kruse, Preprints, ACS Pet. Div., vol. 12, No. 2, Advances in Petrochemical Symposium, Miami Beach, Florida (April 1967), and in the following U.S. patents: Schmerling, 2,448,156, Aug. 31, 1948; Condon, 2,629,748, Feb. 24, 1953; Condon, 2,646,453, July 21, 1953; Schneider et al., 2,742,507, Apr. 17, 1956; Gerzon, 3,096,372, July 2, 1963; Mahan et al., 3,230,269, Jan. 18, 1966; Kruse et al., 3,247,277, Apr. 19, 1966.

However, none of these references teaches the preparation of dihaloalkylcyclohexanes by means of a hydrogen-halogen interchange reaction.

While sulfuric acid generally would be a more desirable catalyst than aluminum chloride for commercial practice, reference to its use as a catalyst for hydrogen-halogen exchange reactions are more scarce. The following references on this subject appear to be the most pertinent:

U.S. Pat. 2,744,940, issued May 8, 1956, Herman Pines, discloses the monochlorination of various alkylcyclohexanes, including 1,4-dimethylcyclohexane, by means of tertiary butyl chloride and employing strong sulfuric acid as catalyst. Under the reaction conditions taught, monochlorination of the starting naphthene occurs but no dichloro products are produced.

U.S. Pat. 2,810,001, issued Oct. 15, 1957, Herbert K. Wiese, discloses the reaction of methylcyclopentane with tertiary butyl chloride at −10° C. to 25° C. utilizing 85–100% $H_2SO_4$ as catalyst. The patent teaches that monochlorination of the methylcyclopentane at the tertiary carbon atom first occurs but that the monochloro product inevitably further reacts, by undergoing a condensation reaction with liberation of HCl, to produce bicyclic monochloro products.

U.S. Pat. 2,831,036, issued Apr. 15, 1958, Herbert K. Wiese, discloses the monochlorination of branched $C_6$–$C_8$ isoparaffins having one or more tertiary carbon atoms by reaction with tertiary butyl chloride at −25° C. to 25° C. employing 85–100% $H_2SO_4$ as catalyst. The patent gives no indication that dichlorides can be produced in this type of reaction.

SUMMARY OF THE INVENTION

The present invention provides a process for utilizing sulfuric acid or hydrofluoric acid to promote a hydrogen-halogen interchange reaction to convert certain types of cycloalkanes into diahalo derivatives. The starting cycloalkanes have the following characteristics: (1) they are alkylcyclohexanes having a tertiary carbon atom at each of the 1- and 4-positions in the ring; and (2) they have two to six alkyl substituents which are methyl, ethyl or n-propyl or any combination thereof. The procedure involves a hydrogen-halogen interchange reaction between one or more of such alkylcyclohexanes and a $C_4$–$C_5$ tertiary alkyl chloride, bromide or fluoride, promoted by means of sulfuric or hydrofluoric acid having a strength of 90–100%. It is essential that the molar ratio of the halogenating agent to the alkyl cyclohexane be above 2:1. The reaction is carried out at a relatively low temperature, viz. in the range of from the freezing point of the acid phase to 50° C. and more preferably 0–30° C.

I have now found that alkylcyclohexanes, as defined above, having tertiary carbon atoms at both the 1- and 4-positions can be made to undergo hydrogen-halogen exchange reactions at both of these positions by employing either sulfuric or hydrofluoric acid as the catalyst. The resulting dihalogenated product is a 1,4-dihalo-1,4-dialkylcyclohexane which may have up to four additional alkyl substituents on the ring. I have further found that alkylcyclohexanes having only one alkyl substituent and those having two or more alkyl substituents but not having two tertiary carbon atoms in the 1,4-arrangement are essentially incapable of undergoing dihalogenation under these reaction conditions. For example, 1,2- or 1,3-dimethylcyclohexane will not dihalogenate, nor will 1,1,2- or 1,1,3- or 1,1,4-trimethylcyclohexane yield dihalo derivatives under the conditions employed in the present process.

The process of the invention comprises the following steps:

(A) establishing a two-phase admixture of
  (1) a phase comprising (a) an alkylcyclohexane having 2–6 unbranched alkyl substituents of 1–3 carbon atoms each, two of said alkyl substituents being attached to tertiary carbon atoms at the 1- and 4-positions, respectively, of the cyclohexane ring, and (b) a tertiary $C_4$–$C_5$ alkyl halide which is a chloride, bromide or fluoride in a molar ratio to said alkylcyclohexane of greater than 2:1,
  (2) and as a second phase a mineral acid selected from the group consisting of 90–100% sulfuric acid and 90–100% hydrofluoric acid;
(B) contacting said phases at a temperature above the freezing point of the acid phase and below 50° C., whereby a hydrogen-halogen interchange reaction between the tertiary alkyl halide and said alkylcyclohexane at its 1,4-position occurs;
(C) and recovering 1,4-dihaloalkylcyclohexane as a reaction product.

In another embodiment of the invention, monohalides of alkylcyclohexanes as above specified, wherein the halogen (Cl, Br or F) is attached to the ring at a tertiary or secondary position, or mixtures of such tertiary and secondary halides, are converted to 1,4-dihaloalkylcyclohexane by contacting a solution thereof in at least an equal molar amount of tertiary $C_4$–$C_5$ alkyl chloride, bromide or fluoride with 90–100% $H_2SO_4$ or 90–100% HF.

DESCRIPTION

As a specific illustration of the process, 10 parts (by wight) of 1,2,3,4,5,6-hexamethylcyclohexane (HMCH) are dissolved in 50 parts of tertiary butyl bromide and the mixture is contacted at 20° C. with 100 ml. of strong sulfuric acid (96% $H_2SO_4$) for 3 hours under a partial pressure of HBr of 50 p.s.i. The HMCH has been prepared by hydrogenating 1,2,3,4,5,6-hexamethylbenzene at 190° C. and 3000 p.s.i. of hydrogen partial pressure for one hour in a rocker bomb, utilizing 3% by weight of a catalyst composed of 5% ruthenium on activated carbon. This hydrogenation procedure will provide essentially a single, all cis isomer of 1,2,3,4,5,6-HMCH which is more reactive for the present purpose than corresponding isomers that have trans configuration. After the HMCH has been reacted under the conditions above specified, the acid and organic phases are separated and the latter is fractionally distilled. A dibrominated product fraction is recovered, the main component of which is 1,4-dibromo-1,2,3,4,5,6-hexamethylcyclohexane.

As a further specific illustration, an alkylcyclohexane feed material is prepared by hydrogenating p-di-n-propylbenzene by means of a ruthenium on activated carbon catalyst under the same conditions as above described except that a temperature of about 100° C. is utilized. The hydrogenated product is a mixture of isomers of 1,4-di-n-propylcyclohexane (DPCH) containing about 80% of the cis isomers, the latter being the more reactive isomer in the present halogenation process. A solution of 10 parts (by weight) of the DPCH in 40 parts of t-butyl fluoride is formed, and the solution is then contacted with five times its volume of anhydrous hydrogen fluoride at 0° C. for 4 hours. The phases are then separated. Water washing followed by fractional distillation of the organic phase yields a fraction composed of 1,4-difluoro-1,4-di-n-propylcyclohexane.

The halogenating agent employed is a $C_4$ or $C_5$ tertiary alkyl chloride, bromide or fluoride or, in other words, t-butyl or t-amyl chloride, bromide or fluoride. Mixtures of these halogenating agents can be used, although it is generally preferable to use a single halogenating agent and usually t-butyl chloride is preferred. Primary or secondary halides are not suitable, for these are largely inert under the reaction conditions of the present process. The molar ratio of halogenating agent to the alkylcyclohexane in the feed mixture is important and must be above 2:1, as otherwise little if any dihalogenation of the cyclohexane ring will be secured. Preferably the molar ratio of the alkyl halide agent to the alkylcyclohexane reactant is above 3:1 and much larger ratios, e.g. 6:1 or 10:1, can be used if desired. After the reaction is completed, any unreacted halogenating agent can be recovered and recycled.

The catalyst for the present reaction can be either strong sulfuric acid or strong hydrofluoric acid. When an alkyl chloride or bromide is used as the halogenating agent, it is preferable to use sulfuric acid rather than hydrofluoric acid as the catalyst. This avoids the possibility of halogen-halogen interchange that otherwise might occur between the HF and the alkyl chloride or bromide or the chloro or bromo reaction product. Such interchange could result in mixed dihalo derivatives of the alkylcyclohexane which ordinarily would not be desired as the product. On the other hand, when an alkyl fluoride is used as the halogenating agent, halogen-halogen interchange is not a factor and either HF or $H_2SO_4$ can advantageously be employed.

The strength of the acid should be in the range of, by weight, 90–100% $H_2SO_4$ or 90–100% HF. Preferably sulfuric acid with a strength of 95–99% $H_2SO_4$ is used. When hydrofluoric acid is employed, a strength in the range of 94–100% HF is preferred. Strength as here used is calculated on an organic matter-free basis and relates to the proportion of $H_2SO_4$ or HF to water present. The catalyst constitutes a liquid phase separate from the organic phase, and the rate of conversion depends upon the intimacy of contacting the two phases. Good agitation expedites conversion and an increase in the ratio of the acid phase to the organic phase also increases the rate of conversion. Usually a volume ratio of acid to organic phase in the range of 1:2 to 20:1 is employed and a ratio in the range of 2:1 to 10:1 is preferred.

When sulfuric acid is used as the catalyst, it is advantageous to conduct the reaction under a partial pressure of HCl, MBr or HF, e.g. a partial pressure in the range of 10–100 p.s.i. The presence of the hydrogen halide tends to inhibit side reactions and helps to secure a higher conversion of the starting alkylcyclohexane to its 1,4-dihalo derivative. Preferably the hydrogen halide employed for this purpose has the same kind of halogen as the tertiary alkyl halide used, so as to avoid the possibility of transhalogenation resulting in different halogen substituents in the reaction products. However such identity of the halides present is not essential for operability of the process, and alkylating agents and hydrogen halides having different halogens can be used together if desired.

The temperature for carrying out the reaction is relatively low, i.e. in the range of from the freezing point of the acid phase to 50° C. Higher temperatures should be avoided since undesirable side reactions will occur. Preferably, a reaction temperature in the range of 0° C. to 30° C. is employed. The acid and organic phases are contacted at a temperature in the specified range until at least a substantial yield of 1,4-dihaloalkylcyclohexane product has been obtained. Suitable reaction times usually are in the range of 0.5–24 hours.

The hydrocarbon feed can be one or more alkylcycloalkanes having two to six, inclusive, unbranched alkyl groups of the $C_1$–$C_3$ range. In other words, these substituents can be methyl, ethyl or n-propyl, or any combination of these alkyl groups. Two of these substituents should be located, respectively, at the 1-position and 4-position of the ring and be the only substituents at these loci, so that the cyclohexane ring will contain a tertiary carbon atom at each of these places. This means that while gem substitution is permissible as to any other alkyl groups that may be present, the starting hydrocarbon must have only a single alkyl group at each of the 1- and 4-positions. Any alkylcycloalkanes as here defined can be dichlorinated, dibrominated or difluorinated in the present process to yield 1,4-dihalo products. Alkylcyclohexanes which are 1,4-dialkylcyclohexanes generally are preferred and particularly those with cis configuration, since the latter tend to undergo the hydrogen-halogen transfer reaction more rapidly than their trans isomers. However any of the more highly substituted alkylcyclohexanes having 3–6 alkyl substituents can be used provided that they have the characteristics above specified. A few examples of the latter are:

1,2-dimethyl-4-ethylcyclohexane;
1,3,3,4-tetraethylcyclohexane;
1,2,3-trimethyl-4,5-diethylcyclohexane;
1,2,4-tri-n-propylcyclohexane;
1,2,3,4-tetraethylcyclohexane;
1,2,2,4,5,5-hexamethylcyclohexane;
1,2,2-trimethyl-4-ethyl-5-n-propylcyclohexane; etc.

The following equation illustrates the desired reaction, starting with 1,4-dimethylcyclohexane (cis or trans) and t-butyl chloride (most hydrogen atoms being omitted, for convenience):

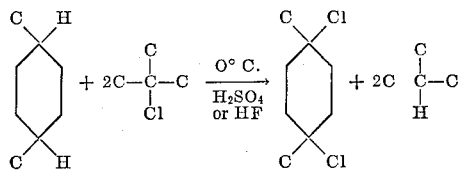

The products of the reaction, as shown, are 1,4-dichloro-1,4-dimethylcyclohexane and isobutane. This dichloro compound is the only cyclic dichloride obtained in the reaction. During the reaction the hydrocarbon is first converted to its tertiary monochloride (not shown) and a minor part of this may isomerize to isomeric secondary monochlorides. Continuing the contacting of phases causes the tertiary monochloride to convert to the ditertiary-dichloride, viz. the 1,4-dichloride, which is the only cyclic dichloride produced in the reaction. Consumption of the tertiary monochloride by conversion in this manner apparently allows secondary monochlorides previously formed to isomerize back to the tertiary monochloride which is then capable of conversion to the 1,4-dichloride. Generally the reaction mixture, after phase contacting has been stopped, will contain a considerable amount of the tertiary monochloride and a lesser amount of secondary monochlorides in addition to the desired 1,4-dichloro product. These monochlorides usually will exceed the dichlorides in amount in view of the difficulty in achieving dihalogenation of the ring via hydrogen-halogen transfer. The monochlorides can be separated by distillation from the dichloride product and recycled or treated separately for further conversion to 1,4-dichloro-1,4-dimethylcyclohexane.

Other alkylcyclohexanes, as herein specified, undergo halogenation in the present process in substantially the same fashion as described above for 1,4-dimethylcyclohexane. It is characteristic that all the alkyl substituents stay essentially in the same position on the ring, both $H_2SO_4$ and HF being ineffective to cause them to isomerize. This is in distinction from the effect of $AlCl_3$ or $AlBr_3$ in the process fo my copending application Ser. No. 883,579 referred to above, wherein some isomerization of alkyl groups on the cyclohexane ring may occur. In the present process the hydrogen-halogen interchange takes place in the acid phase and hence the rate of conversion depends upon the solubility of the reactants in the acid phase and the degree or intimacy of contacting the two phases. The higher the molecular weight of the feed hydrocarbon the lower its solubility in the acid phase will be and the slower will be the conversion rate.

Alkylcyclohexanes which do not have a tertiary carbon atom at both the 1- and 4-positions will monohalogenate under conditions used in the present process but will not form dihalo derivatives. Thus essentially no dihalogenated product is obtained if, for example, either the cis or trans isomer of 1,2- or 1,3-dimethylcyclohexane is employed. The ability to dihalogenate evidently depends upon anchimeric assistance [see Winstein et al., JACS, 75, 147 (1953)] which results only from a 1,4-spacing of alkyl and halogen substituents on the ring.

When the reaction has been completed, the acid phase is separated from the organic phase and the latter may be washed with water to remove any traces of acid remaining. The dihalogenated product can then be separated from the other components in any suitable manner, for example, by fractional crystallization or distillation.

The dihaloalkylcyclohexanes produced by the present invention are useful as intermediates for preparing monomers suitable for making various types of polymers such as polyesters or polyamides. For example, they can be reacted in the presence of strong sulfuric acid with formic acid [see Koch et al., Liebig's Annalen der. Chemie, 618, 251-266 (1958)] to produce corresponding diacids, or with HCN or nitriles [analogous to Ritter reaction, JACS, 70, 4045-4048 (1948)] to form corresponding diamides. Dialcohols, also useful as monomers, can be made by esterifying the diacids and hydrogenating the resulting diesters. Such diacids and dialcohols can be used, for example, to make copolymers analogous to those shown in Caldwell et al. U.S. Pat. 2,891,930, issued June 23, 1959, which describes the use of 1,4-cyclohexanedicarboxylic acid and various diols for preparing polyesters.

Examples I–IV below are specific illustrations of reactions under conditions of the invention. In all runs the organic phases separated from the reaction mixtures were analyzed by GLC.

EXAMPLE I

This run illustrates the dichlorination of cis-1,4-dimethylcyclohexane (DMCH). The reaction mixture was composed of 10 ml. of 96% $H_2SO_4$), 0.50 g. (0.0045 mole) of cis-1,4-DMCH and 2.13 g. (0.023 mole) of t-butyl chloride. The molar ratio of t-butyl chloride to the DMCH was 5.1. These materials were charged to a shaker bomb, gaseous HCl was admitted therein to a partial pressure of 86 p.s.i., and the mixture was shaken for 3 hours at 20° C. Analysis of the organic phase gave the results shown in Table I, which shows the charge composition and the total composition of the final organic layer.

TABLE I.—REACTION OF Cis-1,4-DIMETHYLCYCLOHEXANE (DMCH)

| Components | Composition, area percent | |
|---|---|---|
| | Original | After 3 hrs. |
| Isobutane | | 5.8 |
| t-Butyl chloride | 82.8 | 57.9 |
| Amyl chlorides [1] | | 1.8 |
| Hexyl chlorides [1] | | 1.5 |
| Cis-1,4-DMCH | 17.2 | 1.5 |
| Heptyl and octyl chlorides [1] | | 1.7 |
| Tertiary monochloride of 1,4-DMCH | | 14.8 |
| Secondary monochlorides of 1,4-DMCH [1] | | 6.0 |
| 2,5-dichloro-2,5-dimethylhexane | | 0.2 |
| 1,4-dichloro-1,4-DMCH | | 5.8 |
| Higher boiling non-cyclic chlorides [1] | | 3.1 |

[1] Mixture of compounds.

The data in Table I show substantial formation of the 1,4-dichloro derivative of the starting hydrocarbon and that this was the only cyclic dichloride produced. The amyl, hexyl, heptyl, and octyl chlorides and the higher boiling non-cyclic chlorides evidently result from reactions of the t-butyl chloride such as disproportionation and polymerization. Calculations from the data presented show that over 90% of the cis-1,4-DMCH underwent conversion and that the yield of cyclic products, based on DMCH charged, were as follows:

| | Yield, percent |
|---|---|
| 1,4-DMCH (unconverted) | 8 |
| 1-chloro-1,4-DMCH | 53 |
| Secondary monochlorides of 1,4-DMCH | 22 |
| 1,4-dichloro-1,4-DMCH | 17 |

The 8% of unconverted DMCH and the 75% of total monochlorides of DMCH could be recovered and recycled for further conversion to 1,4-dichloro-1,4-DMCH under similar reaction conditions.

EXAMPLE II

In this example the feed reactant was a mixture of approximately equal parts of the cis and trans isomers of 1-ethyl-4-methylcyclohexane (EMCH), which had been prepared by hydrogenating p-ethyltoluene using a Raney nickel catalyst. The reaction mixture was composed of 10 ml. of 96% $H_2SO_4$, 1.0 g. (0.0079 mole) of the mixture of EMCH isomers and 2.93 g. (0.0317 mole) of t-butyl chloride. The molar ratio of t-butyl chloride to EMCH was 4.0. The procedure was like that of the preceding example except that no HCl was added and the reaction temperature was maintained at 0° C. Samples of the organic phase were taken after total reaction times of 30 and 90 minutes, respectively, and were analyzed. The cyclic chlorides formed were analogous to the three types shown in Example I (i.e. tertiary monochloride, secondary monochlorides and 1,4-dichloride). Their yields, expressed as mole percent on the hydrocarbon feed, are shown in Table II.

EXAMPLES III and IV

Two runs were made substantially like Example II, using the same molar ratios and conditions, except that the hydrocarbon feeds were, respectively, cis-1,4-DMCH and trans-1,4-DMCH. Yields calculated from the analyses of samples taken at various reaction times also are shown in Table II.

The results given in Table II indicate slow conversion rates under the conditions (0° C.) used in all of these runs. Higher conversion rates could be obtained by using a higher reaction temperature and applying HCl under pressure to inhibit side reactions. Higher yields of the 1,4-dichloro products could also be secured by carrying out the reactions for longer times. A comparison of the data for Examples III and IV shows that the cis-1,4-isomer is substantially more reactive than the trans-1,4-isomer. This is generally true for all feed hydrocarbons within the scope of the invention.

EXAMPLES V–VIII

These are comparative examples included for the purpose of showing the importance of having tertiary carbons at the 1,4-positions if dichlorides are to be obtained. Four runs were made at 0° C. in essentially the same way as Examples II and III but using dimethylcyclohexanes having the methyl substituents at the 1,2- and 1,3-positions, as listed in Table III.

TABLE III.—REACTIONS OF 1,2- AND 1,3-DIMETHYLCYCLOHEXANES

| Example | Hydrocarbon feed | Total reaction time, min. | Yield, mole percent on feed | | | |
|---|---|---|---|---|---|---|
| | | | Feed unconverted | Tertiary monochloride | Secondary monochloride | Cyclic dichloride |
| V | Cis-1,2-DMCH | 15 | 56.5 | 33.8 | 9.7 | None. |
| | | 30 | 23.2 | 54.0 | 22.9 | Do. |
| | | 60 | 5.3 | 67.2 | 27.5 | Do. |
| VI | Trans-1,2-DMCH | 15 | 97.4 | 2.1 | 0.5 | None. |
| | | 30 | 84.7 | 11.4 | 3.9 | Do. |
| | | 90 | 47.9 | 43.7 | 18.4 | Do. |
| VII | Cis-1,3-DMCH | 15 | 92.5 | 6.4 | 1.1 | None. |
| | | 30 | 72.0 | 23.5 | 4.5 | Do. |
| | | 90 | 35.5 | 52.5 | 12.1 | Do. |
| VIII | Trans-1,3-DMCH | 15 | 53.7 | 40.5 | 5.8 | None. |
| | | 30 | 22.3 | 64.2 | 13.6 | Do. |
| | | 60 | 4.2 | 77.6 | 18.2 | Do. |

As shown in Table III, the feed hydrocarbons were convertible to monochlorides but none of them was capable of converting to cyclic dichlorides. This is typical of alkylcyclohexanes which do not have tertiary carbon atoms at both 1- and 4-positions.

Analogous results are obtained when other alkylcyclohexanes as herein specified are substituted for the feed hydrocarbons used in Examples I–VI. Likewise essentially equivalent results are obtained when tertiary butyl bromide or fluoride is used in place of the tertiary chloride. The halogenation reaction also proceeds in essentially the same manner when tertiary amyl chlorides, bromides or fluorides are used, but in such cases more side reactions tend to occur. The use of HF in place of $H_2SO_4$ gives similar results, except that when HF is used in combination with a tertiary $C_4$–$C_5$ alkyl chloride or bromide, reactions involving halogen-halogen interchange may also take place resulting in products having mixed halogen substituents.

Another embodiment of the invention comprises converting either tertiary or secondary alkylcyclohexyl monohalides into 1,4-dihaloalkylcyclohexanes. The monohalo feed material in this embodiment is composed of a chlorine, bromine or fluorine substituent and an alkylcyclohexql moiety which corresponds to the alkylcyclohexanes specified above. This feed can be the monohalides normally recovered as intermediate reaction products in reacting

TABLE II.—REACTIONS OF VARIOUS 1,4-DIALKYLCYCLOHEXANES

| Example | Hydrocarbon feed | Total reaction time, min. | Yield, mole percent on feed | | | |
|---|---|---|---|---|---|---|
| | | | Feed unconverted | Tertiary monochloride | Secondary monochlorides | 1,4-dichloride |
| II | Cis and trans-1,4-EMCH | 30 | 75.6 | 19.7 | 3.1 | 1.6 |
| | | 90 | 44.0 | 45.8 | 6.8 | 3.4 |
| III | Cis-1,4-DMCH | 15 | 58.0 | 33.9 | 7.0 | 1.1 |
| | | 30 | 29.2 | 57.8 | 10.8 | 2.2 |
| | | 60 | 7.3 | 71.6 | 14.8 | 6.3 |
| IV | Trans-1,4-DMCH | 15 | 92.8 | 6.5 | 0.5 | 0.2 |
| | | 60 | 55.4 | 43.8 | 7.7 | 3.1 | the alkylcyclohexanes as previously described or it can be monohaloalkylcyclohexanes having the specified structural characteristics and obtained in any other suitable manner, e.g. by addition of HCl, HBr or HF to alkylcyclohexanes corresponding structurally to the described alkylcyclohexane feed materials. In this embodiment the monohaloalkylcyclohexane is dissolved in at least an equimolar part and preferably in at least two parts of the $C_4$-$C_5$ tertiary alkyl chloride, bromide or fluoride and the mixture is contacted with 90-100% sulfuric acid or 90-100% hydrofluoric acid under the same conditions as employed in reacting the hydrocarbon feed. Preferably the type of halogen in both reactants is the same, although this is not essential. This converts the monohalide into the corresponding 1,4-dihaloalkylcyclohexane. For example, in this manner a mixture of tertiary and secondary chloro-1,4-dimethylcyclohexane is converted to 1,4-dichloro-1,4-dimethylcyclohexane as the sole cyclic dichloride product.

When monohalides are recovered in addition to 1,4-dihalides after reacting an alkylcyclohexane feed, they can be reacted separately as above described for further conversion to 1,4-dihalides, or they can be recycled for further conversion in admixture with more alkylcyclohexane feed. In the latter case the amount of $C_4$-$C_5$ tertiary alkyl halide used should be at least two moles per mole of alkylcyclohexane present plus at least one molar per mole of monohalide recycled. Preferably molar ratios substantially above these proportions are used, such as at least 3:1 and at least 2:1, respectively.

The invention claimed is:

1. Process of preparing dihalogenated alkylcyclohexanes which comprises:
   (A) establishing a two-phase admixture of
      (1) a first phase comprising (a) an alkylcyclohexane having 2-6 unbranched alkyl substituents of 1-3 carbon atoms each, two of said alkyl substituents being attached to tertiary carbon atoms at the 1- and 4-positions, respectively, of the cyclohexane ring, and (b) a tertiary $C_4$-$C_5$ alkyl halide which is a chloride, bromide or fluoride in a molar ratio to said alkylcyclohexane of greater than 2:1,
      (2) and as a second phase a mineral acid selected from the group consisting of 90-100% sulfuric acid and 90-100% hydrofluoric acid, the volume ratio of said second phase to said first phase being in the range of 1:2 to 20:1;
   (B) contacting said phases at a temperature above the freezing point of the acid phase and below 50° C., whereby a hydrogen-halogen interchange reaction between the tertiary alkyl halide and said alkylcyclohexane at its 1,4-positions occurs;
   (C) and recovering 1,4-dihaloalkylcyclohexane as a reaction product.

2. Process according to claim 1 wherein said acid is sulfuric acid and the molar ratio of said alkyl halide to said alkylcyclohexane is above 3:1.

3. Process according to claim 2 wherein the strength of the sulfuric acid is 95-99% $H_2SO_4$.

4. Process according to claim 3 wherein said halide is tertiary butyl chloride.

5. Process according to claim 4 wherein said temperature of contacting is in the range of 0-30° C.

6. Process according to claim 1 wherein said acid is hydrofluoric acid having a strength of 94-100% HF and said halide is a tertiary alkyl fluoride.

7. Process according to claim 1 wherein said alkylcyclohexane is a 1,4-dialkylcyclohexane.

8. Process according to claim 7 wherein said tertiary $C_4$-$C_5$ alkyl halide is a chloride and its molar ratio to the 1,4-dialkylcyclohexane is above 3:1, and wherein said acid is sulfuric acid.

9. Process according to claim 8 wherein said alkyl halide is tertiary butyl chloride, the strength of the sulfuric acid is 95-99% $H_2SO_4$ and said temperature of contacting is in the range of 0-30° C.

10. Process according to claim 9 wherein said alkylcyclohexane is 1,4-methylcyclohexane and 1,4-dichloro-1,4-dimethylcyclohexane is recovered from the reaction mixture.

11. Process according to claim 10 wherein said alkylcyclohexane is cis-1,4-dimethylcyclohexane.

12. Process according to claim 7 wherein said acid is hydrofluoric acid having a strength of 94-100° HF and said halide is a tertiary alkyl fluoride.

13. Process according to claim 1 wherein monohaloalkylcyclohexane is also recovered from the reaction mixture and the monohaloalkylcyclohexane is recycled for further reaction in step (B) in admixture with said alkylcyclohexane.

References Cited

UNITED STATES PATENTS

| | | | |
|---|---|---|---|
| 2,744,940 | 5/1956 | Pines | 260—648 R |
| 2,831,036 | 4/1958 | Wiese | 260—676 R |
| 2,810,001 | 10/1957 | Wiese | 260—648 R |
| 3,247,277 | 2/1966 | Kruse et al. | 260—677 XA |
| 3,096,372 | 2/1963 | Gerzon | 260—648 R |
| 3,230,269 | 1/1966 | Mahan et al. | 260—648 R |

FOREIGN PATENTS

| | | | |
|---|---|---|---|
| 1,913,998 | 10/1969 | Germany | 260—649 |

HOWARD T. MARS, Primary Examiner

U.S. Cl. X.R.

260—648 F